US012206301B2

(12) United States Patent
Choi et al.

(10) Patent No.: US 12,206,301 B2
(45) Date of Patent: Jan. 21, 2025

(54) RADIAL AND AXIAL TYPE HYBRID MOTOR

(71) Applicants: HYUNDAI MOTOR COMPANY, Seoul (KR); KIA CORPORATION, Seoul (KR); INDUSTRY-UNIVERSITY COOPERATION FOUNDATION HANYANG UNIVERSITY, Seoul (KR)

(72) Inventors: Jin Ho Choi, Suwon-si (KR); Sung Woo Hwang, Seoul (KR); Myung Seop Lim, Seoul (KR); Jae Hyun Kim, Seoul (KR)

(73) Assignees: HYUNDAI MOTOR COMPANY, Seoul (KR); KIA CORPORATION, Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 17/847,872

(22) Filed: Jun. 23, 2022

(65) Prior Publication Data

US 2023/0163671 A1 May 25, 2023

(30) Foreign Application Priority Data

Nov. 24, 2021 (KR) .................. 10-2021-0163823

(51) Int. Cl.
*H02K 16/04* (2006.01)

(52) U.S. Cl.
CPC .................................. *H02K 16/04* (2013.01)

(58) Field of Classification Search
CPC ......... H02K 16/04; H02K 17/16; H02K 17/20
See application file for complete search history.

(56) References Cited

U.S. PATENT DOCUMENTS

| 3,411,027 | A | * | 11/1968 | Rosenberg | ........... | H02K 21/042 |
| | | | | | | 310/156.55 |
| 3,466,477 | A | * | 9/1969 | Newill | ................. | G01R 31/343 |
| | | | | | | 310/67 R |
| 5,886,445 | A | * | 3/1999 | Hsu | ........................ | H02K 16/00 |
| | | | | | | 310/211 |
| 7,129,611 | B2 | * | 10/2006 | Hsu | ....................... | H02K 21/046 |
| | | | | | | 310/191 |
| 11,476,741 | B2 | * | 10/2022 | Hattori | ................. | H02K 21/046 |
| 2009/0295249 | A1 | * | 12/2009 | Kinjou | ................... | H02K 21/14 |
| | | | | | | 310/181 |

(Continued)

FOREIGN PATENT DOCUMENTS

| CN | 108847726 B | 6/2020 | | |
| DE | 19927279 A1 | * 3/2000 | ............. | H02K 17/16 |

(Continued)

*Primary Examiner* — Tran N Nguyen
(74) *Attorney, Agent, or Firm* — MCDONNELL BOEHNEN HULBERT & BERGHOFF LLP

(57) ABSTRACT

A hybrid motor includes a rotor, a radial stator facing the circumference of the rotor, and first and second axial stators facing both sides of the rotor. The rotor includes conduction bars arranged in radial and axial directions, corresponding to the radial stator and the axial stators, and end-rings electrically connecting the conduction bars.

4 Claims, 6 Drawing Sheets

(56) References Cited

U.S. PATENT DOCUMENTS

2017/0214281 A1    7/2017  Seo et al.

FOREIGN PATENT DOCUMENTS

| | | | |
|---|---|---|---|
| DE | 102015223058 | * | 5/2017 |
| JP | 2010063196 | * | 3/2010 |
| JP | 2020127288 | * | 8/2020 |
| KR | 10-1597965 B1 | | 2/2016 |

* cited by examiner

RADIAL AND AXIAL TYPE HYBRID MOTOR

CROSS REFERENCE TO RELATED APPLICATIONS

This application claims priority to and the benefits of Korean Patent Application No. 10-2021-0163823, filed on Nov. 24, 2021, the disclosure of which is incorporated herein by reference in its entirety

TECHNICAL FIELD

The present disclosure relates to a radial and axial type hybrid motor.

BACKGROUND

The description in this section merely provides background information related to the present disclosure and does not necessarily constitute the prior art.

As the motorization of vehicles intensifies, the demand for non-rare-earth motors is increasing. As non-rare-earth motors that can practically replace permanent magnet synchronous motors (PMSM), inductor motors (IM) are attracting attention, and therefore, active research is being done to improve the performance of induction motors.

An induction motor largely consists of a stator and a rotor, and rotates the rotor by using a rotating magnetic field generated by a stator winding and an induced current generated by the rotating magnetic field.

The performance of induction motors, such as power factor and efficiency, decreases with the increasing number of poles. For this reason, most induction motors have a small number of poles, around 2 to 8 poles, and this makes end coils relatively longer.

Meanwhile, stator winding methods are largely categorized as concentrated winding or distributed winding. The distributed winding is a winding method in which a coil of each phase is distributed in two or more slots, which has the advantage of less harmonics compared to the concentrated winding. In the case of inductor motors, the distributed windings are generally used to minimize harmonic components generated by rotor and stator slots. A disadvantage of distributed windings is that their end coils are longer than those of concentrated windings.

Such an increase in the length of end coils leads to an increase in the axial length of induction motors and consequently an increase in the overall volume of the induction motors.

SUMMARY

According to at least one embodiment, the present disclosure provides a hybrid motor including a rotor, a radial stator facing the circumference of the rotor, a first axial stator facing a first side of the rotor, and a second axial stator facing a second side of the rotor. The rotor includes a plurality of conduction bars arranged in radial and axial directions, corresponding to the radial stator and the first and second axial stators, and a plurality of end-rings electrically connecting the plurality of conduction bars.

DETAILED DESCRIPTION

Figure 1A:
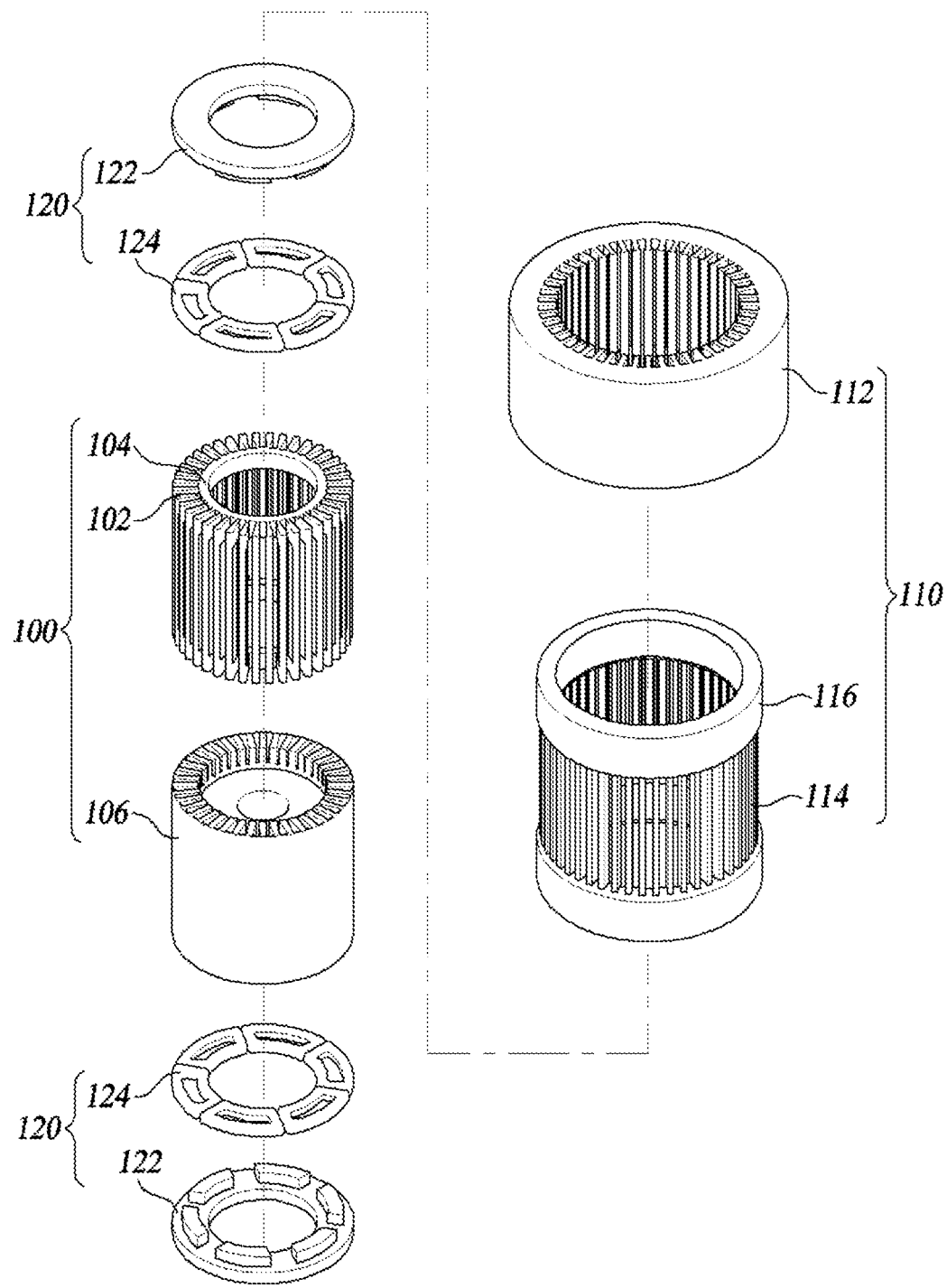
FIG. 1A is an exploded perspective view schematically illustrating a hybrid motor according to an exemplary embodiment of the present disclosure.

The present disclosure provides a radial and axial type hybrid motor that can increase torque without increasing volume in comparison to conventional induction motors, by placing an axial stator in an empty space inside an end coil and arranging conduction bars radially on both sides of a rotor.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

FIG. 1A is an exploded perspective view schematically illustrating a hybrid motor according to an exemplary embodiment of the present disclosure.

Figure 1B:
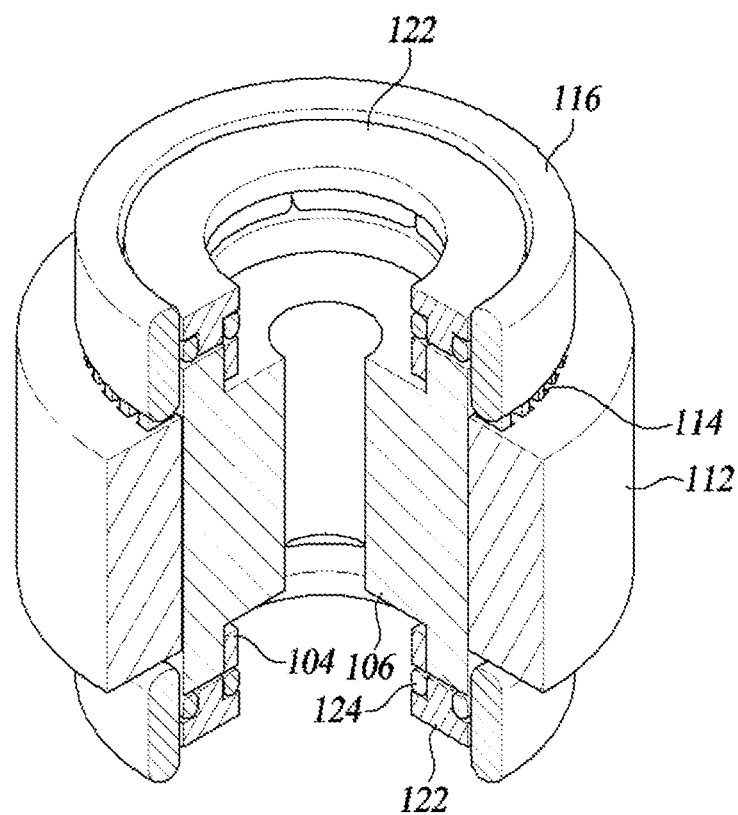
FIG. 1B is a partial cross-sectional perspective view schematically illustrating a hybrid motor according to an exemplary embodiment of the present disclosure.

FIG. 1B is a partial cross-sectional perspective view schematically illustrating a hybrid motor according to an exemplary embodiment of the present disclosure.

Referring to FIG. 1A, the hybrid motor according to an exemplary embodiment of the present disclosure may include all or part of a rotor 100, a radial stator 110, and axial stators 120.

The rotor 100 may include a plurality of conduction bars 102 that are arranged in radial and axial directions, an end-ring 104 where the plurality of conduction bars 102 are electrically connected, and a rotor core 106 with a plurality of slots where the conduction bars 102 are arranged (or inserted). Here, the axial direction refers to the direction of the axis of rotation of the rotor 100, and the radial direction refers to a direction perpendicular to the axis of rotation. The rotor core 106 may have a cylindrical structure with a shaft hole formed at the center. Accordingly, the rotor 100 is near-cylindrical as a whole. A detailed structure of the conduction bars 102 according to an exemplary embodiment of the present disclosure will be described below with reference to FIGS. 3A and 3B.

The radial stator 110 may be disposed to face the circumference of the rotor 100. The radial stator 110 may include a first stator core 112 providing a magnetic flux path and a first coil 114 wound on the first stator core 112, and generate a rotating magnetic field through a current applied to the first coil 114. Here, as illustrated in FIG. 1B, a portion of the first coil 114 exposed out of slots in the first stator core 112 is referred to as an end coil 116.

The axial stators 120 may be disposed to face both sides of the rotor 100. Each axial stator 120 may include a second stator core 122 providing a magnetic flux path and a second coil 124 wound on the second stator core 122, and generate a rotating magnetic field through a current applied to the second coil 124.

Referring to FIG. 1B, the axial stators 120 may be disposed inside the end coil 116. According to an embodiment of the present disclosure, the height of the axial stators 120 may be designed to be smaller than the height (or length) of the end coil 116, in order to increase torque density without increasing volume in comparison to conventional radial induction motors having the radial stator 110, but not necessarily limited to this.

Meanwhile, in the radial stator 110 and the axial stators 120, the first coil 114 and the second coil 124 may be connected and wound as a single body at the position of each pole and receive a current from an inverter (not shown), or the first coil 114 and the second coil 124 may be separately wound and receive currents from their respective inverters. In other words, the radial stator 110 may receive current from a first inverter (not shown) while the axial stators 120 may receive current from a second inverter (not shown).

When the radial stator 110 and the axial stators 120 receive currents from their respective inverters, the radial stator 110 and the axial stators 120 may be selectively driven depending on load conditions. For example, both the radial stator 110 and the axial stators 120 may be driven during high-load operation, and either the radial stator 110 or the axial stators 120 may be driven during low-load operation. In this way, efficiency may be improved.

Moreover, when the radial stator 110 and the axial stators 120 receive currents from their respective inverters, a rotating magnetic field generated by the axial stators 120 may rotate at synchronous or asynchronous speed with respect to the rotor 100. The inverter supplying current to the second coil 124 may be controlled such that the rotating magnetic field generated by the axial stators 120 rotates at synchronous or asynchronous speed with respect to the mechanical rotation speed of the rotor 100.

On the other hand, when the radial stator 110 and the axial stators 120 receive currents from the same inverter, the rotating magnetic field generated by the axial stators 120 may rotate at asynchronous speed with respect to the rotor 100.

Prior to describing a conduction bar structure of a hybrid motor according to an exemplary embodiment of the present disclosure, a conduction bar structure of a conventional radial induction motor will be described below with reference to FIG. 2.

Figure 2:
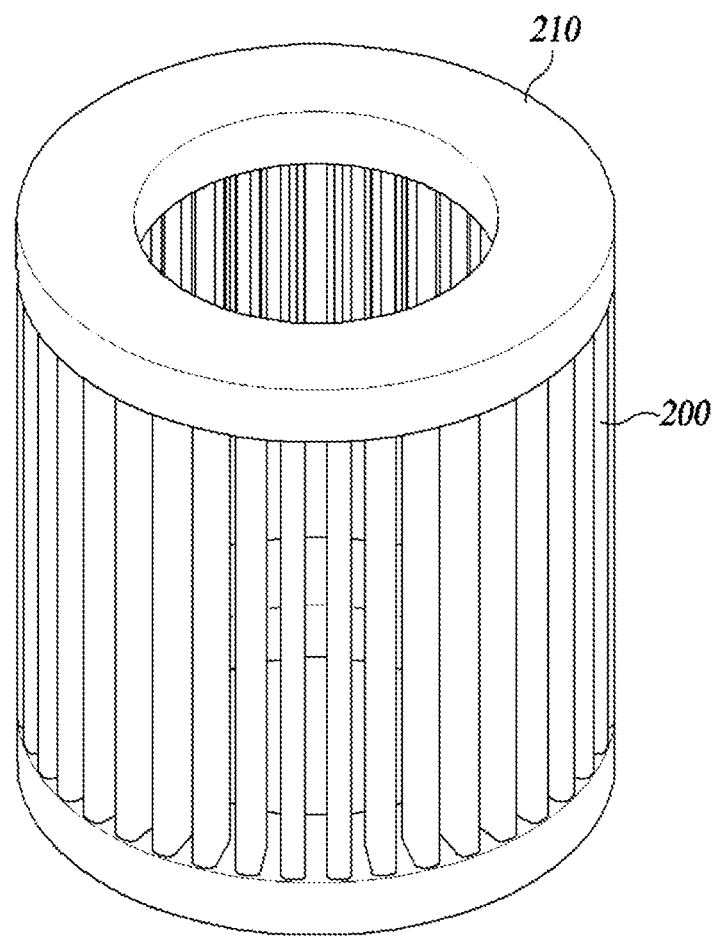
FIG. 2 is a perspective view schematically illustrating a conductor bar structure of a radial induction motor of the prior art.

FIG. 2 is a perspective view schematically illustrating a conduction bar structure of a conventional radial induction motor.

Referring to FIG. 2, the rotor of the radial induction motor includes a plurality of conduction bars 200 arranged radially from the axis of rotation and an end-ring 210 provided on both ends of the conduction bars 200, that interconnects the plurality of conduction bars 200. Here, the conduction bars 200 are arranged radially from the axis of rotation so that their length direction is parallel to the axial direction of the rotor.

Meanwhile, the stator of the radial induction motor may include a coil wound in such a way as to correspond to the conduction bars 200, and may be identical or similar to the radial stator 110 according to an embodiment of the present disclosure.

Figure 3A:
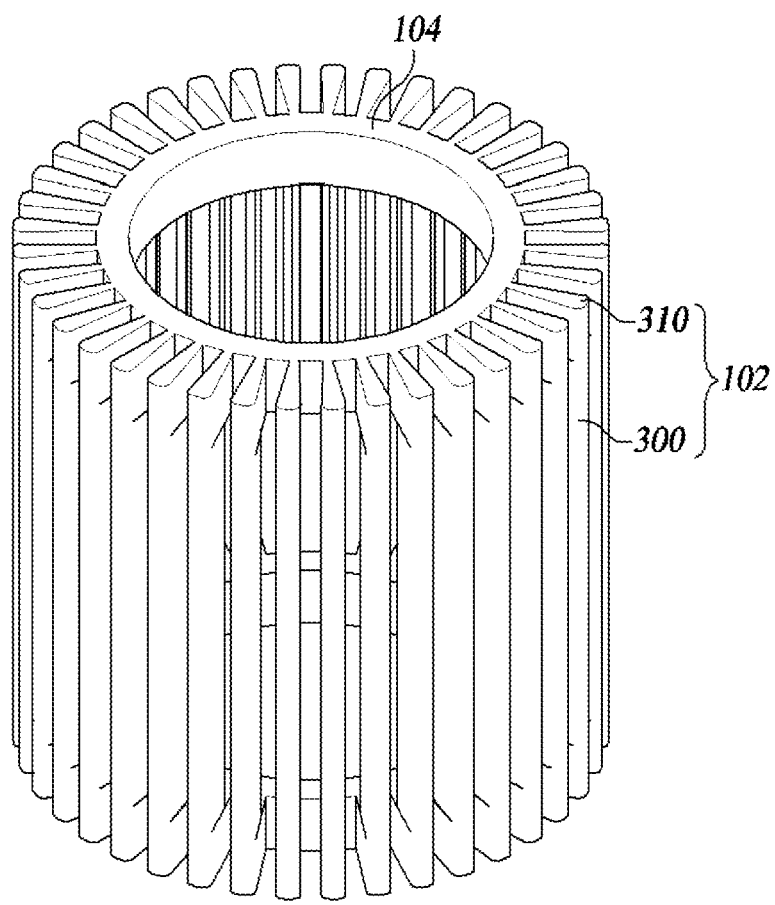
FIG. 3A is a perspective view schematically illustrating a conduction bar structure of a hybrid motor according to an exemplary embodiment of the present disclosure.

FIG. 3A is a perspective view schematically illustrating a conduction bar structure of a hybrid motor according to an exemplary embodiment of the present disclosure.

The conduction bars 102 may include a plurality of first conduction bars 300 corresponding to the radial stator 110 and a plurality of second conduction bars 310 connected to both ends of the first conduction bars 300 and corresponding to the axial stators 120.

A plurality of first conduction bars 300 are circumferentially arranged on the circumference of the rotor 100, and a plurality of second conduction bars 310 are radially arranged on both sides of the rotor 100. Specifically, according to an embodiment of the present disclosure, the first conduction bars 300 are arranged radially from the axis of rotation so that their length direction is parallel to the axial direction of the rotor 100, and the second conduction bars 310 are arranged radially from the axis of rotation so that their length direction is parallel to the radial direction of the rotor 100.

End-rings 104 are provided on one end of the second conduction bars 310 to electrically and mechanically connect the plurality of second conduction bars 310. Specifically, one end of each second conduction bar 310 is electrically and mechanically connected to any one of the end-rings 104, and the other end of each second conduction bar 310 is electrically and mechanically connected to any one of the first conduction bars 300. Accordingly, the first conduction bars 300, the second conduction bars 310, and the end-rings 104 are electrically connected as a single body.

According to an embodiment of the present disclosure, when a rotating magnetic field generated by the radial stator 110 induces currents in the first conduction bars 300, the induced currents flow to the second conduction bars 310 as well, and an axial magnetic flux is created by the radial currents flowing through the second conduction bars 310.

Likewise, when a rotating magnetic field generated by the axial stators 120 induces currents in the second conduction bars 310, the induced currents flow to the first conduction bars 300 as well, and a radial magnetic flux is created by the axial currents flowing through the first conduction bars 300.

Accordingly, with the addition of torque generated by the radial magnetic flux and torque generated by the axial magnetic flux, the conduction bar structure according to an embodiment of the present disclosure can form more magnetic flux compared to the conduction bar structure of FIG. 2, and this may increase overall average torque.

The conduction bar structure according to an embodiment of the present disclosure may be similar in concept to the way in which the second conduction bars 310 on both sides are arranged and spread out along the circumference of the rotor. Accordingly, given that the radius of the rotor is constant, the hybrid motor according to an embodiment of the present disclosure may provide the same level of output as the radial induction motor whose rotor has a longer axial length (and therefore larger volume).

Furthermore, according to an embodiment of the present disclosure, as the second conduction bars 310 are arranged on both sides of the rotor 100, the radius and width of the end-ring 104 may be shorter, and the magnetic flux path may be longer, compared to the conduction bar structure of FIG. 2, thereby improving driving torque characteristics.

Figure 3B:
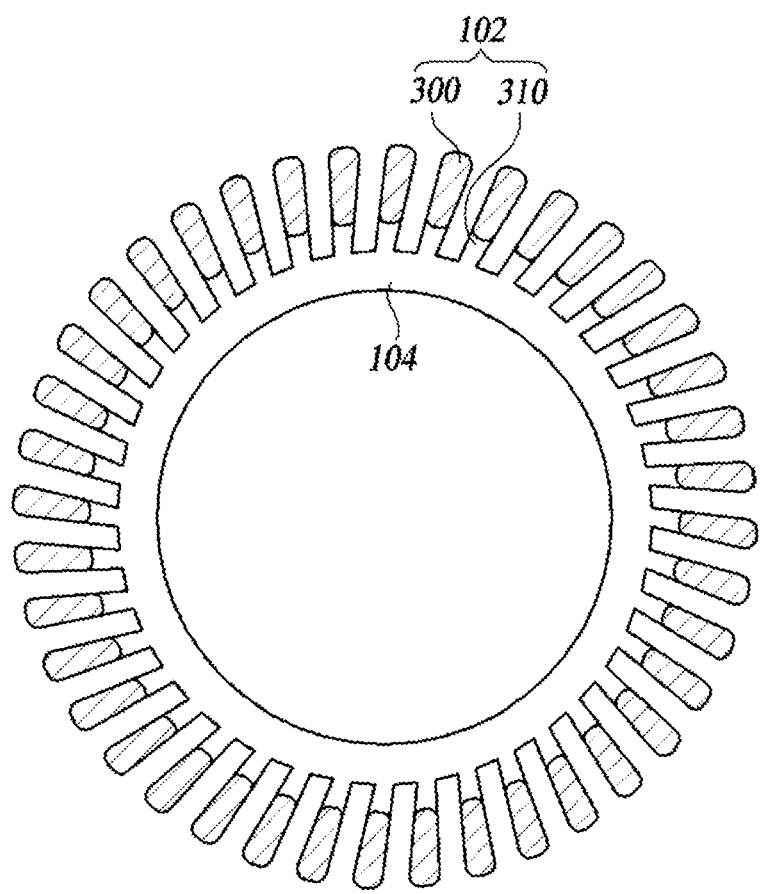
FIG. 3B is a horizontal cross-sectional view schematically illustrating a conduction bar structure of a hybrid motor according to another exemplary embodiment of the present disclosure.

FIG. 3B is a horizontal cross-sectional view schematically illustrating a conduction bar structure of a hybrid motor according to another exemplary embodiment of the present disclosure.

Referring to FIG. 3B, the first conduction bars 300 and/or the second conduction bars 310 according to another embodiment of the present disclosure may be distorted to have a skew at a predetermined angle. By distorting the first conduction bars 300 and/or the second conduction bars 310 to a skewed shape, torque ripple may be reduced, and therefore noise and/or vibration characteristics of the motor may be improved.

Figure 4:
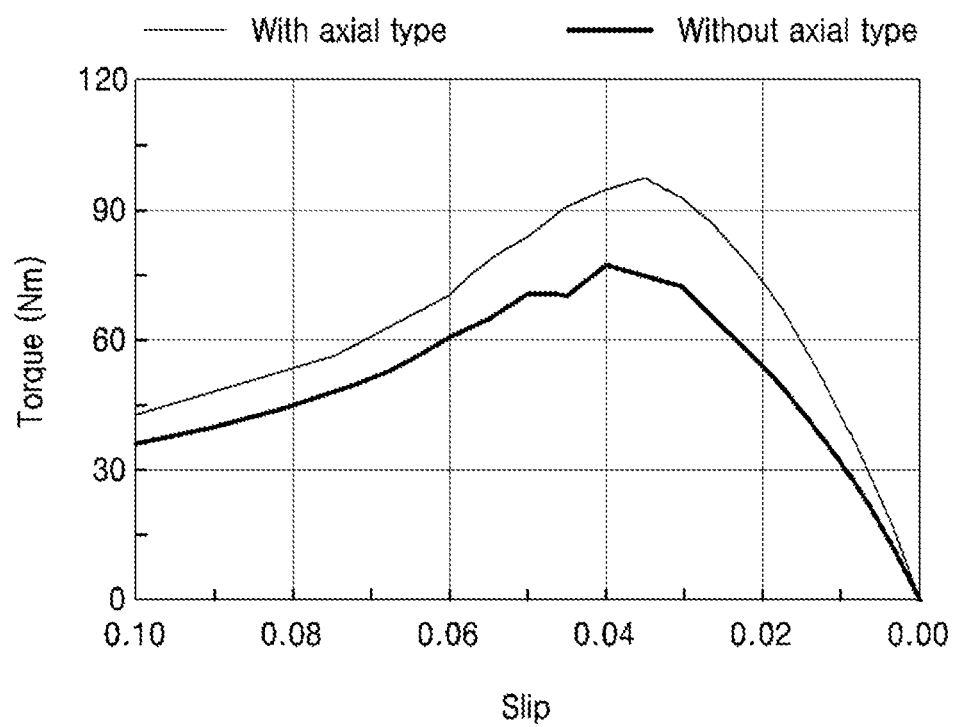
FIG. 4 is a graph showing torque-slip characteristics of a hybrid motor according to an exemplary embodiment of the present disclosure.

FIG. 4 is a graph showing torque-slip characteristics of a hybrid motor according to an exemplary embodiment of the present disclosure.

In FIG. 4, "With axial type" represents a hybrid motor according to an embodiment of the present disclosure, and "Without axial type" represents a radial induction motor.

Referring to FIG. 4, it can be seen that the hybrid motor according to an embodiment of the present disclosure has more torque than the radial induction motor.

As described above, according to an embodiment of the present disclosure as described above, it is possible to increase torque without increasing volume in comparison to conventional induction motors, by placing an axial stator in an empty space inside an end coil and arranging conduction bars radially on both sides of a rotor.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

The invention claimed is:

1. A hybrid motor comprising:
a rotor;
a radial stator facing an outer circumference of the rotor; and
a first axial stator facing a first axial end side of the rotor and a second axial stator facing a second axial end side of the rotor;
wherein the rotor comprises:
a plurality of conduction bars arranged in radial and axial directions, corresponding to the radial stator and the first and second axial stators; and
a plurality of end-rings electrically connecting the plurality of conduction bars and spaced from each other in axial directions;
wherein the first and second axial stators are disposed on an inner side, which is based on the radial direction, of the radial stator;
wherein each of the first and second axial stators is surrounded by an axial end coil of the radial stator and outwardly faces the axial end coil, in the radial direction; and
wherein each of the first and second axial stators is disposed inward in the axial direction with respect to the axial end coil of the radial stator so each of the first and second axial stators does not protrude in the axial direction with respect to the axial end coil of the radial stator;
wherein each of the first and second axial stators includes a stator core providing a magnetic flux path and an axial coil wound on the stator core; and
wherein at least a portion of the axial coil is disposed in a gap formed in the radial direction between the axial end coil and the stator core.

2. The hybrid motor of claim 1, wherein the plurality conduction bars each comprise:
a plurality of first conduction bars are radially positioned with respect to the axial axis and are circumferentially arranged, at equal circumference intervals on the circumference of the rotor; and
a plurality of second conduction bars radially arranged on the first and second sides of the rotor with respect to the axial axis and are spaced from each other at equal circumference intervals on the circumference of the rotor.

3. The hybrid motor of claim 2, wherein each of the plurality of end-rings is positioned on one end of the second conduction bars to electrically connect the second conduction bars.

4. The hybrid motor of claim 1, wherein each of the conduction bars is disposed non-parallel to the radial direction, when viewed from one side of the axial direction.

* * * * *